United States Patent [19]

Kuo et al.

[11] Patent Number: 5,740,839
[45] Date of Patent: Apr. 21, 1998

[54] FLEXIBLE EXTENSION CONDUIT

[76] Inventors: Hsien-Jen Kuo; Hsien-Wen Kuo, both of No. 93, Sec. 4, Chin-Hwa Rd., Tainan, Taiwan

[21] Appl. No.: 823,177

[22] Filed: Mar. 25, 1997

[51] Int. Cl.$^6$ ............................................. F16L 27/00
[52] U.S. Cl. .................. 138/120; 138/155; 255/264; 255/145.3
[58] Field of Search ..................... 138/120, 110, 138/103, 155, 111, 114; 285/261, 264, 145.2, 145.3, 146.1

[56] References Cited

U.S. PATENT DOCUMENTS

| | | | |
|---|---|---|---|
| 3,910,277 | 10/1975 | Zimmer | 138/120 X |
| 4,703,135 | 10/1987 | Magnani et al. | 138/120 X |
| 4,919,458 | 4/1990 | Masini et al. | 285/261 X |
| 5,069,486 | 12/1991 | Kimura et al. | 138/120 X |
| 5,129,681 | 7/1992 | Yano et al. | 285/264 X |
| 5,134,251 | 7/1992 | Martin | 138/120 X |
| 5,143,123 | 9/1992 | Richards et al. | 138/120 |
| 5,215,338 | 6/1993 | Kimura et al. | 138/120 X |
| 5,248,170 | 9/1993 | Francis | 138/120 X |
| 5,353,843 | 10/1994 | Hoag | 138/120 X |
| 5,449,206 | 9/1995 | Lockwood | 138/120 X |

*Primary Examiner*—Patrick F. Brinson
*Attorney, Agent, or Firm*—Morton J. Rosenberg; David I. Klein; Jun Y. Lee

[57] ABSTRACT

The present invention provides a flexible extension conduit, in which a basic unit includes a joint base, two joints, two ball valves, a sliding pipe, two dirt covers, a flat pipe, two damping collars and two embedded retainers, and so on. Therein the embedded retainer is placed in the caulking groove of the ball valve so that the caulking groove of the embedded retainer catches the catching rim in the caulking groove of the ball valve. The sliding pipe is put in the ball valve and welded a thrust collar at the smaller end to limit the sliding range of the sliding pipe in the ball valve, and the combined ball valve is located in the spherical bearing consisting of the joint base and the joint. When the earth crust moves or the temperature gets a great changing, the dirt cover can prevent the sand and the soil from seeping in, and the conduit can change the length and bend an angle in each section. If a greater extension and a bigger flexibility are needed, more than one basic units can be connected together to provide more free space for extending and pivoting.

8 Claims, 5 Drawing Sheets

5,740,839

FLEXIBLE EXTENSION CONDUIT

BACKGROUND OF THE INVENTION

(1) Field of the Invention

The present invention relates to a flexible extension conduit, and more particularly to the conduit with simple construction and higher flexibility for transmission of petrol or high pressure liquid.

(2) Description of Prior Art

In accordance with a common laying conduit so far, the seamless steel tube is employed mostly. If meeting channel or river as laying underground, the conduit should change the direction or erect a conduit bridge to keep off. In this way, an elbow of the seamless steel tube has to be welded at the place in which the conduit should change the direction to connect two tubes at different directions, in this case, the joint is a rigid connection, so the flexibility of it seems to be not enough, therefore the conduit is easy to be deformed by the dead weight of itself, especially to meet earth quake or crust shrinkage caused by soft soil which may cause the connecting area to break up. For this sake, an elastomer connector is used as an angle fitting to connect to the seamless steel tube with two flanges at both ends. In this way, the elastomer connector provides a certain flexibility to bear some deformation of the conduit, but after a long service time, the elastomer is easy to be degenerated and hardened, and led up to make an appearance of ageing fissure even to break up as the internal pressure getting enough high or a slight distortion happened.

OBJECTS AND SUMMARY OF THE INVENTION

It is therefore an object of this invention to provide a flexible extension conduit that not only support the length changing of the conduit, but also bear a higher flexibility even to work as flexible elbow.

The basic unit of present invention includes a joint base, two joints, two ball valves, a sliding pipe, two dirt covers, a flat pipe, two damping collars and two embedded retainers, and so on. Therein the embedded retainer placed in the ball valve grasps the sliding pipe on, and a thrust collar is welded on the small end of the sliding pipe to prevent the sliding pipe from sliding off from the ball valve, then the valve holding the sliding pipe is located in the joint base co-operating with the damping collar and the joint so that the ball valve can turn a certain angle and the sliding pipe can slide in or out at a certain range as the earth crust motion or the change of the temperature occured. In the same way, a flat pipe is located in the spherical bearing of the sliding pipe.

DETAILED DESCRIPTION OF PREFERRED EMBODIMENTS

Figure 1:
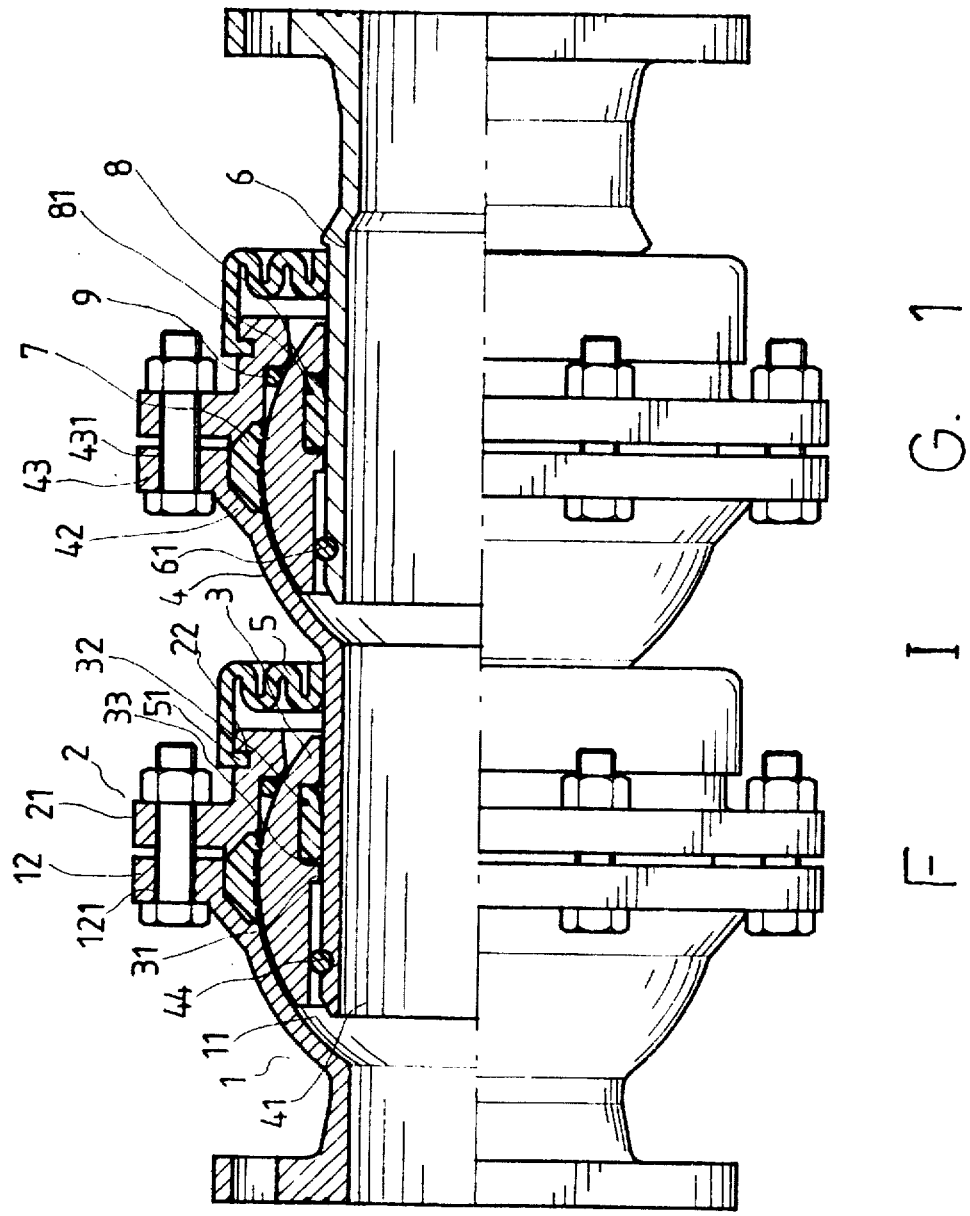
FIG. 1 is a partially cross-section view of the present invention.

Referring to FIG. 1, the basic unit of the present invention includes a joint base 1, two joints 2, two ball valves 3, a sliding pipe 4, two dirt covers 5, a flat pipe 6, two damping collars 7 and two embedded retainers 8.

The joint base 1 is a hollow tubular base having a spherical housing 11 at one side and a ring flange 12 with several holes 121 at the mouth of the spherical housing 11.

The joint 2 works as a cover of the joint base 1, corresponding to the joint base 1. There are a spherical housing and a ring flange 21 at one end and a ring groove 22 near the other end.

The ball valve 3 is a ball spool with a canal crossing the corner, and there is a circular stopper 31 formed in the canal, by the circular stopper 31 there is a caulking groove 33 with a catching rim 32 at the topside.

The sliding pipe 4 consists of a flat tube portion 41 and a spherical bearing 42 with a ring flange 43 at edge, and several holes 431 formed on the flange 43.

The dirt cover 5 made of elastic rubber material has a center crossing hole, and a caulking collar 51 extending from the inside edge at one end.

The flat pipe 6 is an extending flat pipe with a ring flange at one end, and there is a thrust collar 61 will be weld nearing the other end.

The damping collar 7 is made of colloid waterproof material, and there are several fins 71 formed at inside.

The embedded retainer 8 is a colloid collar, and has a caulking groove 81 formed at the topside.

In combining, the embedded retainer 8 is placed in the caulking groove 33 of the ball valve 3 so that the caulking groove 81 of the embedded retainer 8 catches the catching rim 32 in the caulking groove 33. Then, putting the dirt cover 5, the joint 2, a ring 9 and the ball valve 3 with the embedded retainer 8 on the sliding pipe 4 from the flat tube portion 41 sequentially, and welding a thrust collar 44 on the end of the flat tube portion 41 to prevent the sliding pipe from sliding off from the ball valve 3 and to keep a segment from the ball valve 3 for the sliding pipe 4 moving, and covering the dirt cover 5 on the joint 2 by setting the caulking collar 51 on the ring groove 22, next the damping ring 9 is put on the ball valve 3 by the fins 71 grasping the outer surface of the ball valve 3. Finally, bolting the ring flanges 12 21 on to fix the joint base 1 and the joint 2 together so as to press the damping collar 7 to deform to seal the gap between the joint base 1 and the joint 2 working as a sealing ring. In the same way, co-operating with an embedded retainer 8, a ball valve 3 and a damping collar 7 and so on, the flat pipe 6 is located in the spherical bearing 42 of the sliding pipe 4. In this procedure, a thrust collar 61 is welded on the outside nearing the flat end to prevent the flat pipe 6 from sliding off from the ball valve 3.

Figure 2:
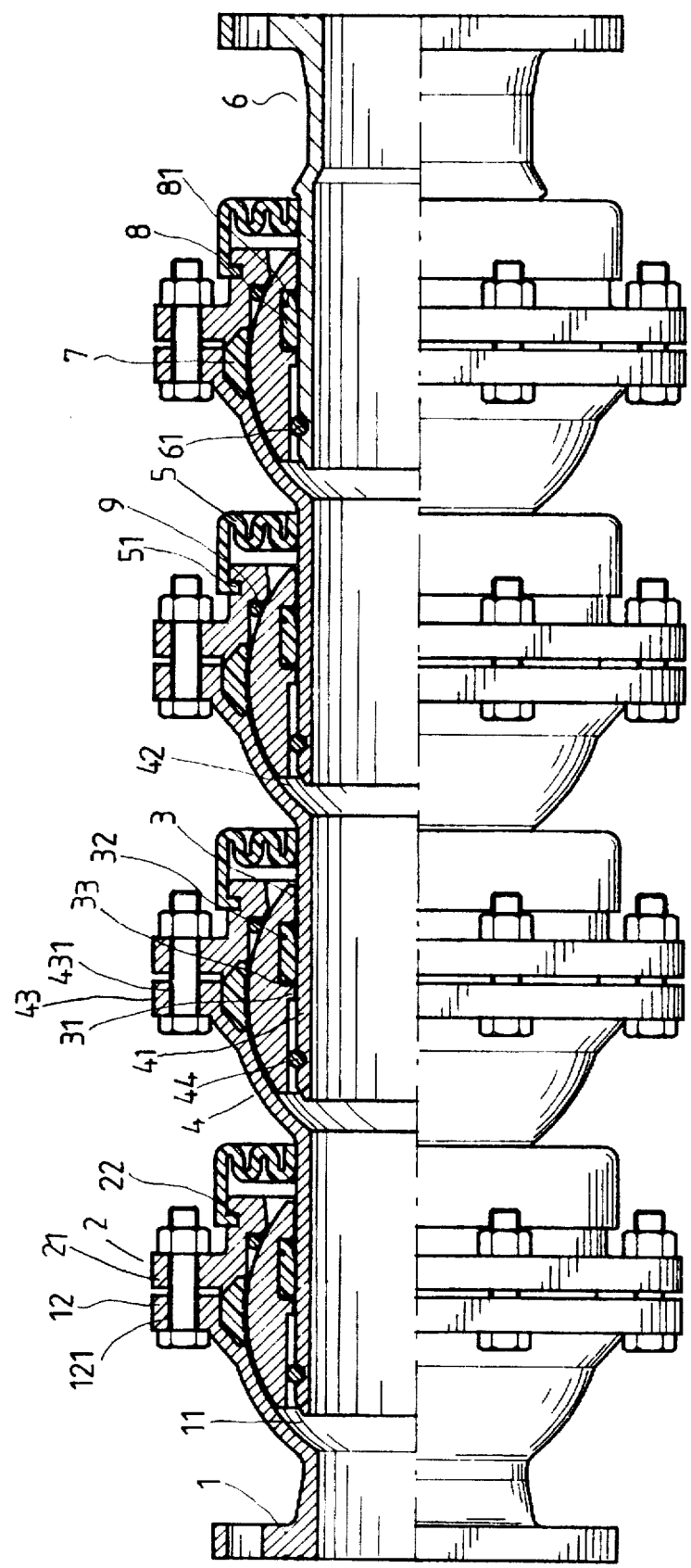
FIG. 2 is a partially cross-section view showing the first operation of the present invention.

If used in a place with a bigger extension and flexibility, referring to FIG. 2, the number of the sliding pipes 4 can be increased properly to elongate the length of the flexible extension conduit so as to suit the requirement of variety situations.

Figure 3:
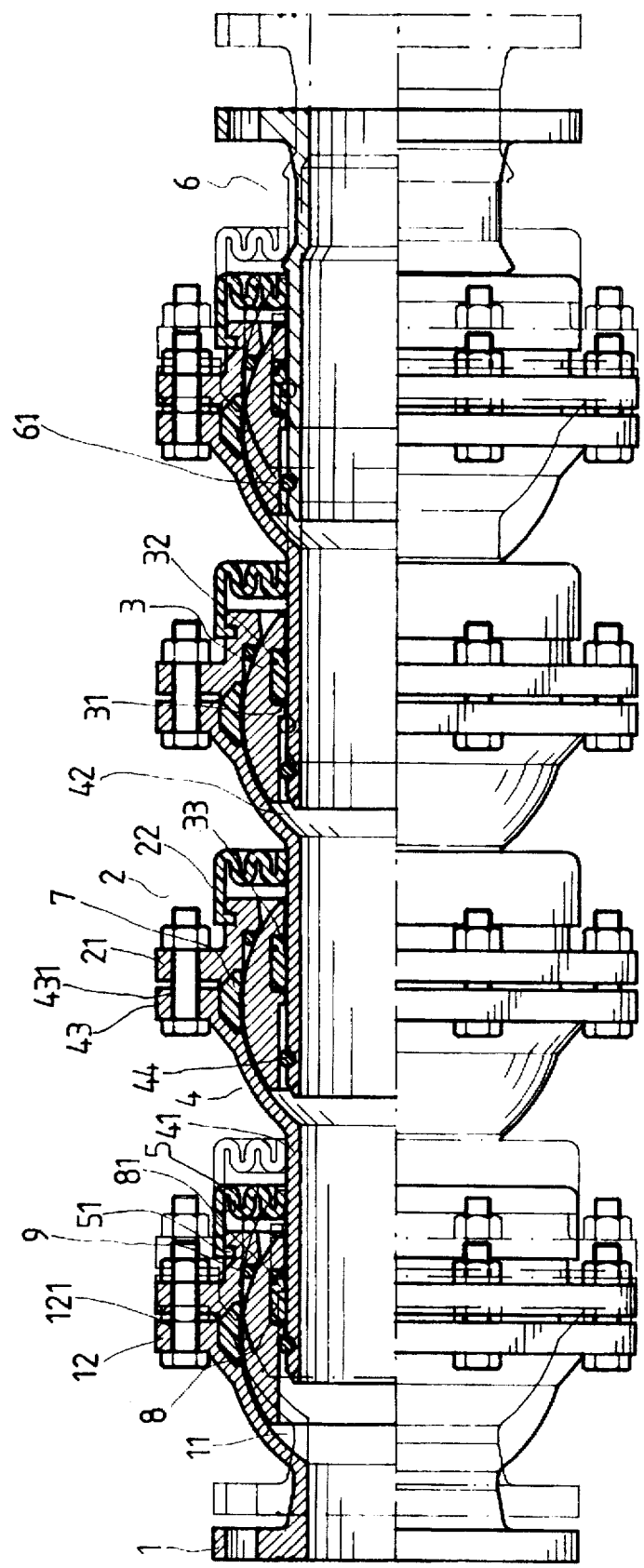
FIG. 3 is a partially cross-section view showing an action of the first operation of the present invention (1)

In practising as laying underground, referring to FIG. 3, the embedded retainer 8, the ring 9 and the damping collar 7 of the present invention can provide triple efficient sealing in any temperature to prevent the object in the conduit from leaking. When the temperature increases or decreases over a certain value, many basic units of the present invention can provide an extension space which is large enough so that the sliding pipes 4 can not slide off from the ball valves 3 to improve the safety of the conduit.

Figure 4:
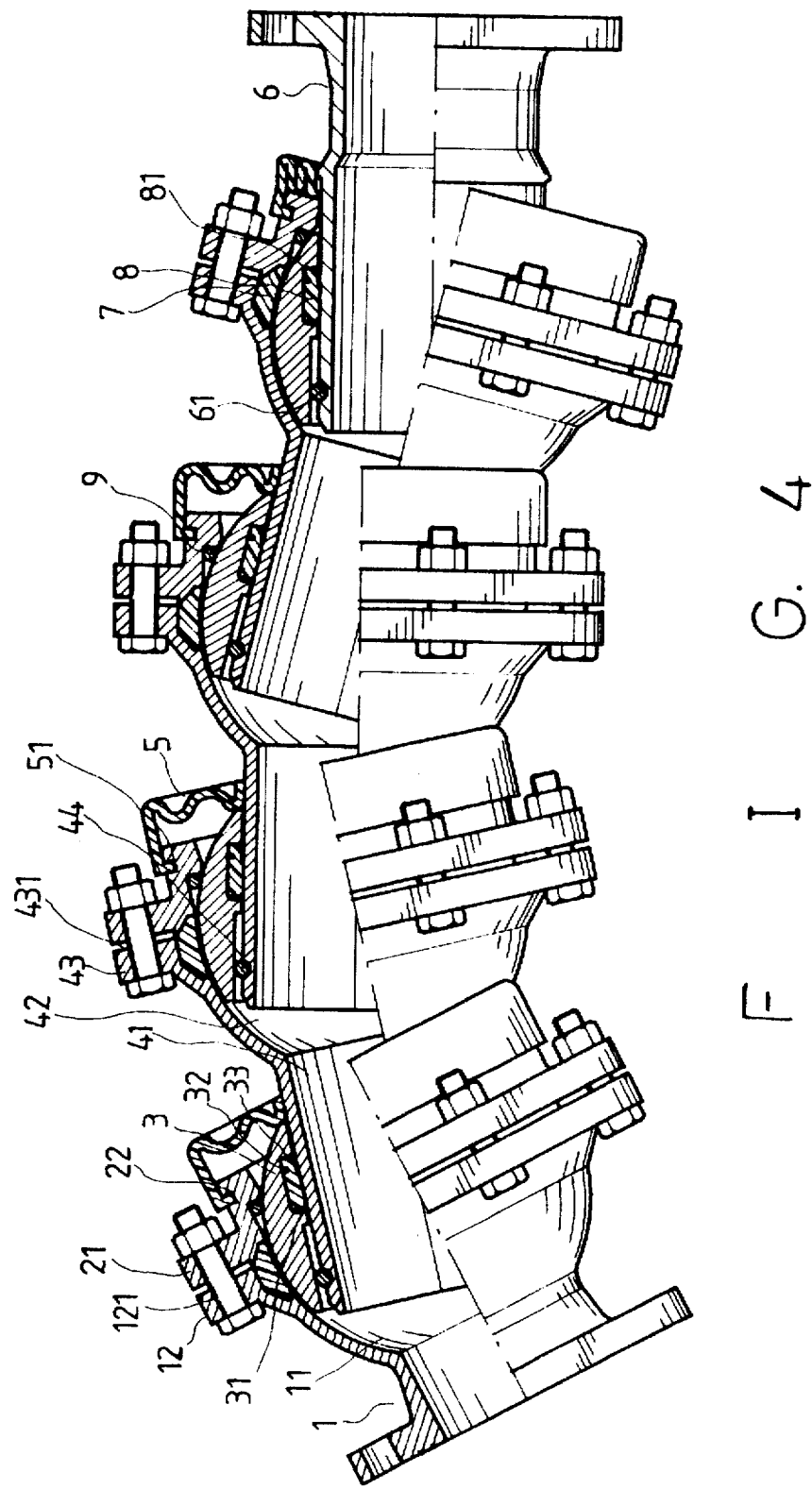
FIG. 4 is a partially cross-section view showing an action of the first operation of the present invention (2)
Figure 5:
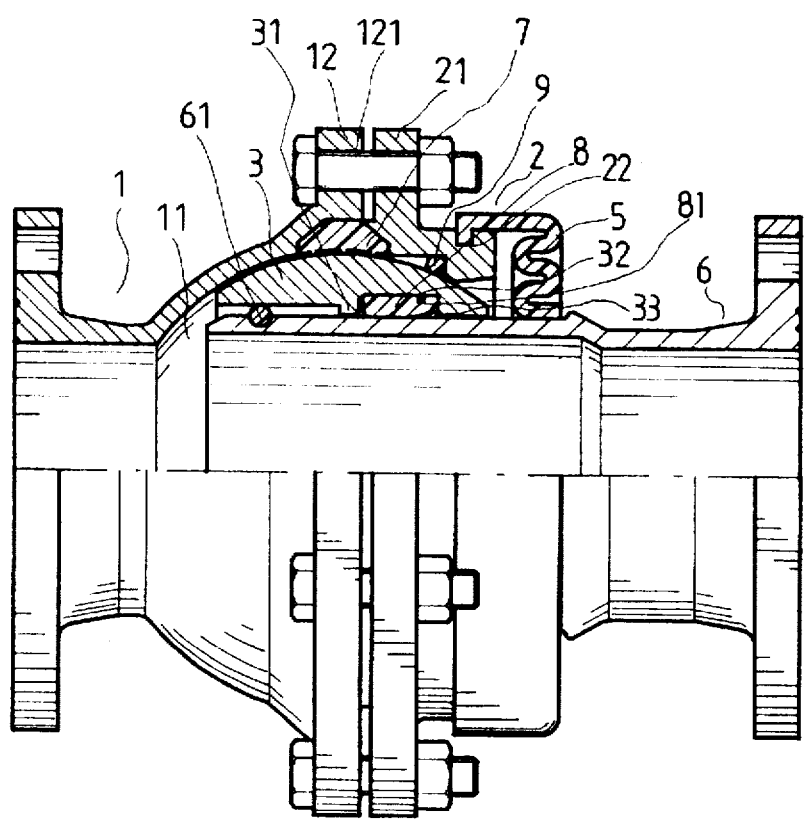
FIG. 5 is a partially cross-section view showing the second operation of the present invention.

Additionally, if the earth crust moving, referring to FIG. 4, the sliding pipes 4 can pivot an angle on the ball valves 3 respectively. In this case, the embedded retainer 8 and the dirt cover 5 are pivoted according to the ball valve 3 and the sliding pipe 4 together so that the sealing efficacy does not change.

We claim:

1. A flexible conduit assembly comprising:

(a) at least one joint base member having a base passage extending axially therethrough, said joint base member having coaxially disposed spherical housing and annular base flange sections, said spherical housing section having an inner wall portion defining a base socket chamber;

(b) at least one sliding pipe member having a pipe passage extending axially therethrough, said sliding pipe member having a tube section, an annular pipe flange section, and a spherical bearing section coaxially disposed therebetween, said tube section extending into said base socket chamber of said joint base member, said pipe passage being in open communication with said base passage of said joint base member, said spherical bearing section having an inner wall portion defining a pipe socket chamber;

(c) a flat pipe member having a tubular pipe section extending into said pipe socket chamber of said sliding pipe member;

(d) first coupling means for displaceably coupling said sliding pipe member to said joint base member; said first coupling means being adapted to enable both linear and pivotal displacement of said sliding pipe member relative to said joint base member; and, (e) second coupling means for displaceably coupling said sliding pipe member to said flat pipe member; said second coupling means being adapted to enable both linear and pivotal displacement of said sliding pipe member relative to said flat pipe member.

2. The flexible conduit assembly as recited in claim 1 wherein said flexible conduit assembly further comprises at least a second sliding pipe member and third coupling means, said tube section of one said sliding pipe member extending into said pipe socket chamber of the other said sliding pipe member, said pipe passages of said sliding pipe members being in open communication, said third coupling means displaceably coupling together said sliding pipe members, said third coupling means being adapted to enable both linear and pivotal displacements of one said sliding pipe member relative to the other.

3. The flexible conduit assembly as recited in claim 1 wherein each of said first and second coupling means includes:

(a) a ball valve member captured slidably against said inner wall portion of one of said base socket and pipe socket chambers by one of said sliding pipe member tube and flat pipe member pipe sections, said ball valve member having an outer surface portion in substantial registration with said inner wall portion and having formed thereon a stopper portion projecting toward said one of said tube and pipe sections;

(b) a thrust collar affixed to said one of said tube and pipe sections adapted for limiting the linear displacement thereof relative to said ball valve member by engaging said ball valve member stopper portion;

(c) a joint member securely coupled to one of said base and pipe flange sections for retaining said ball valve member within said one of said base and pipe socket chambers;

(d) a damping collar captured against said joint member and said one of said base and pipe flange sections for sealing said coupling thereof; and, (e) an annular dirt cover coaxially mated to said one of said tube and pipe sections, said dirt cover lockingly engaging said joint member.

4. The flexible conduit assembly as recited in claim 3 wherein each of said first and second coupling means further includes an annular embedded retainer having formed thereon a retaining groove, said embedded retainer being coaxially captured between said ball valve member and said one of said tube and pipe sections.

5. The flexible conduit assembly as recited in claim 4 wherein said ball valve member has formed therein adjacent said stopper portion a slotted portion, said stopper portion having a retaining rim projecting therefrom, said slotted portion receiving said embedded retainer, said retaining rim engaging said retaining groove of said embedded retainer.

6. The flexible conduit assembly as recited in claim 2 wherein each of said coupling means includes:

(a) a ball valve member captured slidably against said inner wall portion of one of said base socket and pipe socket chambers by one of said sliding pipe member tube and flat pipe member pipe sections, said ball valve member having an outer surface portion in substantial registration with said inner wall portion and having formed thereon a stopper portion projecting toward said one of said tube and pipe sections;

(b) a thrust collar affixed to said one of said tube and pipe sections adapted for limiting the linear displacement thereof relative to said ball valve member by engaging said ball valve member stopper portion;

(c) a joint member securely coupled to one of said base and pipe flange sections for retaining said ball valve member within said one of said base and pipe socket chambers;

(d) a damping collar captured against said joint member and said one of said base and pipe flange sections for sealing said coupling thereof; and, (e) an annular dirt cover coaxially mated to said one of said tube and pipe sections, said dirt cover lockingly engaging said joint member.

7. The flexible conduit assembly as recited in claim 6 wherein each of said first and second coupling means further includes an annular embedded retainer having formed thereon a retaining groove, said embedded retainer being coaxially captured between said ball valve member and said one of said tube and pipe sections.

8. The flexible conduit assembly as recited in claim 7 wherein said ball valve member has formed therein adjacent said stopper portion a slotted portion, said slotted portion having a retaining rim projecting therefrom, said slotted portion receiving said embedded retainer, said retaining rim engaging said retaining groove of said embedded retainer.

* * * * *